Oct. 6, 1931.  J. P. TARBOX  1,826,440

VEHICLE BODY WALL CONSTRUCTION

Filed Sept. 1, 1927

INVENTOR.

*Jno. P. Tarbox*

Patented Oct. 6, 1931

1,826,440

UNITED STATES PATENT OFFICE

JOHN P. TARBOX, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY WALL CONSTRUCTION

Application filed September 1, 1927. Serial No. 216,908.

My invention relates to vehicle bodies and more particularly to such bodies in which the walls are in large part constituted by light gauge inner and outer sheet metal panels joined together in the margins of the door and window openings and in their outer margins.

It has heretofore been proposed to make these bodies with outer stampings of an extent to include at least one door or window opening and to form the entire jamb faces of the opening by flanges at the edges of the opening, and by forming the complementary inner panel as a relatively flat stamping. This made the outer stamping a very rigid and strong structure in and of itself, but left the inner panel by itself relatively weak and liable to injury in storage and handling. Also, the outer stamping, because of its great depth, substantially equal to the thickness of the wall was correspondingly difficult to form by die stamping operations.

It is an object of my invention to provide a double wall construction of this class in which the outer and inner stampings are more nearly alike as to strength and rigidity prior to assembly and yet relatively easy to form by die stamping operations; and in which, when they are joined together, the resulting structure is as strong, if not stronger than the former construction, and is well adapted for the securing to its inside surface of the upholstery, especially upholstery of that class which is most readily secured by tacking.

I attain these objects by making the outer and inner stampings of approximately the same depth of draw and by joining them, particularly in the edges of the door openings, so as to form a door overlap shoulder intermediate the outer and inner wall surfaces. The space between the inner surface of said shoulder and the transversely extending wall of the inner panel is filled by a tacking strip, which provides with the inner surface of the inner panel a substantially smooth continuous surface for the application of the upholstery which can be secured by simply tacking it to the tacking strip.

Figure 1:
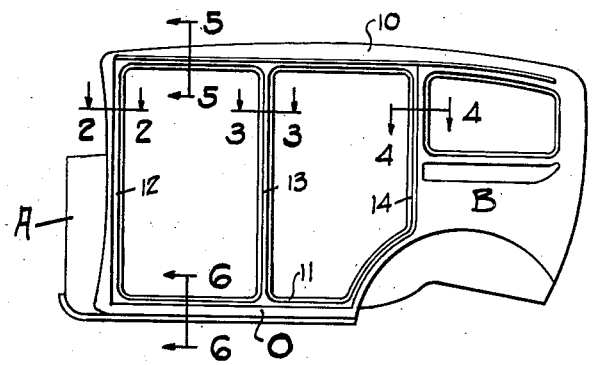
Figure 2:
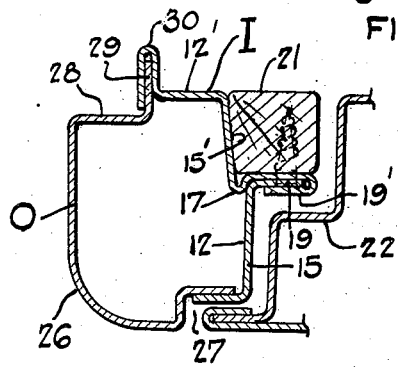
Figure 5:
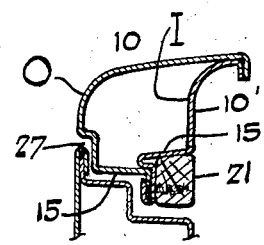
Figure 6:
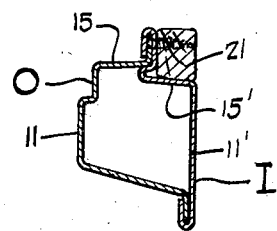
Figure 3:
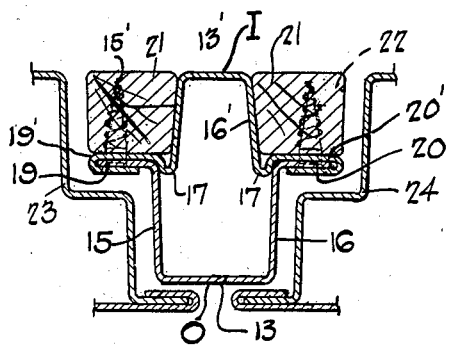
Figure 4:
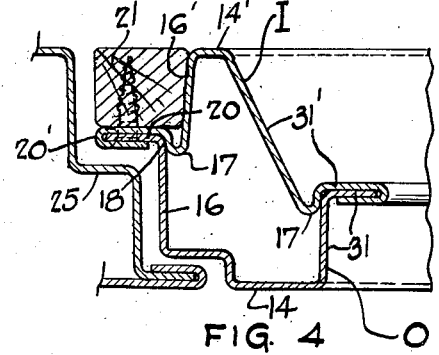

Other and further objects and advantages and the manner in which they are realized will be apparent from the following detailed description, taken in connection with the accompanying drawings, in which, Fig. 1 shows in side elevation a sedan type of body in which my invention is embodied, Figs. 2, 3, 4, 5 and 6 are detailed sectional views, the sections being taken respectively, on the correspondingly numbered lines of Fig. 1.

The body selected for illustration is comprised of the front unit A including the cowl, portions of the A posts and the upper and lower windshield headers, the side units B each extending from the A post to and around the rear quarter, a rear unit (not shown) connecting the side units, and a roof unit (not shown) connecting the front side and rear units.

I have illustrated one form of the invention in detail only in connection with a side unit B.

This side unit comprises a unitary outer panel O, preferably formed by a unitary sheet metal stamping including a side header portion 10, a threshold portion 11, an A-post portion 12, a B—C post portion 13, and a D-post portion 14, and an inner panel I comprising corresponding portions 10', 11', 12', 13', 14', which is also preferably formed as a unitary stamping.

As clearly appears in the sectional views, each of the outer and inner stampings is flanged transversely of the door openings, the outer panel being formed with the continuous transverse flanges 15 and 16 extending respectively, around the front and rear door openings, while the inner panel stamping is formed with the corresponding flanges 15' and 16'. These flanges on the outer and inner panels are of substantially the same depth, thereby facilitating the drawing thereof, because the drawings are thereby made correspondingly shallow for a wall of usual thickness, yet each of the panels, because of the angle and channel formation incident to these flanges and to flanges in their peripheral portions is made quite rigid and strong and can, therefore, be readily handled and stored prior to usage and in final assembly, without great danger of possible injury, which has not heretofore been the case with the relatively flat inner panel stampings.

The flanges 15 and 16 of the outer panel are offset in final assembly from the flanges 15′, 16′ of the inner panel, the flanges of the latter being provided with a return bent portion designated generally by the numeral 17 which seats within the edges of the flanges 15, 16 of the outer panel and forms shoulders 18 for a purpose to be presently described.

The transverse flanges 15 and 16 are provided with the lateral flanges 19 and 20, respectively, extending into the respective door openings. These flanges 19 and 20 are overlapped by corresponding flanges 19′ and 20′ on the inner panel, the edges of which are crimped over the flanges 19 and 20 respectively, to cooperate with the shoulders 18 to form a locked crimped joint.

From the foregoing description it will be seen that the combined outer and inner panels form a body wall at the door openings in which the post portions are each of a channel or angle section of a depth approximately equal to half the width of the wall, and the joining together of the flanges 19, 19′ and 20, 20′ produces a strong door overlap intermediate the outer and inner planes of the wall and preferably substantially midway between said planes.

I preferably fill in the rabbet formed by the flanges 15′ and 16′ of the inner panel and their lateral door overlap flanges 19′ and 20′ respectively, with wooden tacking strips 21, and secure these strips to the overlapping flanges of the outer and inner panels as by screws. One side of these strips forms a portion of the door jamb, while the adjacent inner side of the strip provides a surface substantially flush with the inner surface of the inner panel I. The upholstery (not shown) can be readily applied to this surface, and secured in place by tacking it to the strips 21.

The door rails shown at 23, 24, and 25 are rabbeted to correspond to the rabbeted post sections provided by the wall construction just described.

In their edges beyond the door openings the outer and inner panels may be joined either by welding or crimping and at such distances from the door openings as is consistent with the division into units. In the embodiment shown in the drawings, the A-post portions 12 and 12′ of the outer and inner panels are joined in the upper portion of the A-post to a front stamping 26 formed on the outside with a rabbet 27 to receive the edge of the door, and on the inside with a rabbet 28 to receive the edge of the windshield. The free edge of the outer panel is secured to the front panel in the rabbet 27 as by welding, and the free edge of the inner panel is secured to the edge flange 29 forming a wall of the rabbet 28 as by crimping, as shown at 30.

In the rear quarter window opening, the joinder between the panels around the window opening is through the lateral flanges 31 and 31′ projecting into the widow opening from the transverse flanges 32 and 32′ respectively, of the outer and inner panels.

At the bottom the panels are joined by a crimped joinder as at 33 and at the top by a welded joinder of the abutting flanges 34 and 34′ on the respective panels.

The advantages of this construction hereinbefore described may be briefly summarized as follows: (1) It divides the depth of draw between the outer and inner stampings and avoids an extreme depth of draw in either stamping. (2) It simplifies the construction at the B—C post since the usual rabbets are omitted, their place being taken by the crimped flanged joinder between inner and outer panels. (3) Stampings can be made with greater certainty and less loss from breaking. (4) The inner panel is made stiffer and stronger and can be handled, therefore, with less danger of damage from handling. (5) With the deeper draw, the inner panel can be formed more accurately. (6) In general, the overall section is believed to be somewhat stiffer than in those sections in which the entire depth of draw is taken up in one panel. (7) Certain commonly used types of upholstery may be fastened very readily.

What I claim is:—

1. A vehicle body wall embodying inner and outer panels joined together to form a hollow wall structure including framing and paneling, at least one of which panels extends entirely around a doorway opening, and each of which panels is flanged transversely in the margins of the opening and laterally along the edges of the transverse flanges into the doorway opening, the panels being joined together through said lateral flanges.

2. A wall construction for vehicle bodies having a doorway opening therein comprising an inner panel stamping having a body portion and a transverse flange in the doorway opening terminating in a lateral flange serving as a door overlap, and a tacking strip seated in the angle formed by said transverse and lateral flanges and secured therein.

3. A wall construction for vehicle bodies having a doorway opening therein comprising an inner panel stamping having a body portion substantially in the inner plane of the wall, a transverse flange in the margins of a doorway opening, and a lateral flange extending from the edge of said transverse flange, a tacking strip seated in the angle formed by said flanges and having its inner surface substantially flush with the body of the panel, whereby it forms therewith a substantially smooth surface extending to the edge of the door opening for the attachment of upholstery.

4. A body wall construction for vehicle bodies embodying inner and outer panels joined together to form a hollow wall structure including framing and paneling, at least one of which panels is comprised of a sheet metal stamping extending completely around a doorway opening and each of which is flanged transversely toward the other in the margins of the doorway opening, and again laterally at their meeting edges and joined together through the lateral flanges of said flanged meeting edges approximately in the central plane of the wall.

5. A wall construction for vehicle bodies having an opening, said wall construction comprising spaced inner and outer panels joined together to provide combined framing and outer paneling and having laterally turned flanges constituting the margins of said opening, the edges of the flanges being turned to form flanges lying substantially in the mid plane of the openings, one of said latter flanges having a portion lapping around the edge of the other.

In testimony whereof he hereunto affixes his signature.

JOHN P. TARBOX.